(12) United States Patent
Cerwall

(10) Patent No.: US 6,275,701 B1
(45) Date of Patent: Aug. 14, 2001

(54) METHOD AND DEVICE IN A MOBILE TELECOMMUNICATIONS SYSTEM

(75) Inventor: Carl Patrik Cerwall, Tyresö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/028,747

(22) Filed: Feb. 24, 1998

(30) Foreign Application Priority Data

Feb. 25, 1997 (SE) .................................... 9700668

(51) Int. Cl.[7] ........................................ H04Q 7/20
(52) U.S. Cl. ............................................ 455/436
(58) Field of Search ................... 455/436, 437, 455/438, 439, 452, 453, 434

(56) References Cited

U.S. PATENT DOCUMENTS

| | | | |
|---|---|---|---|
| 4,811,380 | 3/1989 | Spear | 379/60 |
| 5,404,355 * | 4/1995 | Raith | 370/95.1 |
| 5,428,601 | 6/1995 | Owen | 370/17 |
| 5,437,054 | 7/1995 | Rappaport et al. | 455/33.1 |
| 5,483,666 * | 1/1996 | Yamada et al. | 455/33.1 |
| 5,491,837 * | 2/1996 | Haartsen | 455/62 |
| 5,606,548 * | 2/1997 | Vayrynen et al. | 370/252 |
| 5,768,267 * | 6/1998 | Raith et al. | 370/329 |
| 5,790,551 * | 8/1998 | Chan | 370/458 |
| 6,018,661 * | 1/2000 | Raith et al. | 455/437 |

FOREIGN PATENT DOCUMENTS

| | | |
|---|---|---|
| 0690 650 | 1/1996 | (EP) . |
| 2303027 | 2/1997 | (GB) . |
| WO96/07287 | 3/1996 | (WO) . |

OTHER PUBLICATIONS

Abstract of Japanese Patent No. 8289353, Teshirogi Keiichi et al., published Nov. 1, 1996.
Abstract of Japanese Patent No. 6315006, Endo Takushi, published Nov. 8, 1994.

* cited by examiner

*Primary Examiner*—Daniel Hunter
*Assistant Examiner*—Thuan T. Nguyen
(74) *Attorney, Agent, or Firm*—Burns, Doane, Swecker & Mathis, L.L.P.

(57) ABSTRACT

The present invention relates to a method and an apparatus in a mobile telecommunications system for the re-establishment of a speech connection, especially one that risks being interrupted prematurely. A parameter (Q) indicating the quality of the traffic channel (TCH) on which the speech connection is implemented, is compared to a predetermined value ($Q_1$). If the parameter (Q) is lower than said value ($Q_1$) the speech connection (340) is parked temporarily on a dedicated control channel (DCCH) of high quality. When a traffic channel (TCH) again becomes idle (360) the speech connection is handed over (370) to this channel, which may either be associated with the base station originally serving the speech connection or another base station in the mobile telecommunications system.

19 Claims, 3 Drawing Sheets

METHOD AND DEVICE IN A MOBILE TELECOMMUNICATIONS SYSTEM

TECHNICAL FIELD

The present invention relates to a method in a mobile telecommunications system for restoration of a connection, especially a connection that risks being interrupted prematurely.

The invention also relates to a device for carrying out said method.

DESCRIPTION OF RELATED ART

A cellular mobile telecommunications system generally has to be able to handover a connection between different cells in the system, that is, an inter cell handover. Typical situations in which an inter cell handover will have to be performed are when a mobile subscriber moves from one cell to another, or in case of an overload in one cell.

In some case, for example when one or more channels are exposed to disturbances, it may be advantageous to assign a new channel to an existing connection within the same cell, that is, to perform an intra-cell handover.

If an inter- or intra-cell handover of a connection is needed, but a suitable new channel to which to hand over the connection cannot be found, there is a risk that the connection will be interrupted. The most common reason for a connection interruption is that a mobile subscriber moves to an area in which the radio coverage of the communication system is too weak or completely missing. Disturbing radio transmitters in or outside the system may also interfere with the radio channel of a connection and cause the premature interruption of the connection. A mobile subscriber may also have moved into an overloaded cell in which no idle channels are available. If the connection cannot be handed over to a channel in an adjacent cell, with which the mobile subscriber has contact, or if the mobile subscriber entirely lacks radio contact with other cells in the system, the connection is interrupted when the signal becomes too weak. A connection to a mobile subscriber may also be interrupted even if the subscriber has radio contact with a cell in which idle channels are available. This may happen if a system parameter in the communication system is exceeded. The timing advance parameter in a Time Division Multiple Access (TDMA) system is one such system parameter. The Timing advance parameter states the time by which a mobile station must bring forward its transmission in order for its information to fit into the frame structure of the serving base station. When the distance between a mobile station and the base station with which it is communicating exceeds a certain value, the timing advance parameter is unable to compensate for the propagation delay between the mobile station and the base station, and the connection is interrupted.

A threshold value maxTA, set by the operator of the mobile telecommunications system in order to mark out a cell border of a base station is another system parameter limiting the maximal distance from which a mobile station can communicate with a certain base station. If the distance between a mobile station and the base station with which it communicates exceeds maxTA, the connection is interrupted.

Reconfiguration of a cell normally implies that all traffic transmitted through the cell must cease. This constitutes another reason for the interruption of connections. Of course, a base station can also cease to serve connections, entirely or in part, on more unpredictable occasions, such as power failure or other serious problems.

The connection of a certain mobile station, having a low priority, may have to be interrupted because a new connection having a higher priority is established in the cell in which the connection is set up. If all ongoing connections in the cell have a higher priority than said first connection, when the new connection is set up, the first connection will have to be assigned to a traffic channel in another cell. If there is no idle capacity in the other cells with which the mobile station has contact, the connection is interrupted. Usually connections for transmitting data are assigned a lower priority than speech connections in which speech is transmitted in real time.

There are two principally different ways of reducing the fraction of interrupted connections in a mobile telecommunications system. It is possible to try to prevent interrupted connections, and to, to the degree possible, try to re-establish the connection that risk being interrupted soon, or that have recently been interrupted.

The preventative actions may be concentrated on increasing the radio coverage, improving the quality and/or increasing the capacity. The radio coverage may be increased by introducing more base stations, improved antennas and/or increased output power from the base stations. The quality may be improved by refining the signal encoding or by increasing the channel spacing in the system. The connection capacity of the system may be increased by increasing the frequency range of the system or by reducing the channel spacing, which of course in turn may result in a reduced quality. All of said preventative actions imply high costs for the telecommunications operator while none of the actions will guarantee that no connection is ever prematurely interrupted.

Solutions that seek to re-establish interrupted connections, or connections that will probably soon be interrupted, offer relatively inexpensive complement to the above mentioned preventative actions.

From the Patent Specification U.S. Pat. No. 4,811,380 a method of preventing the loss of a connection at handover is known. If a connection between a first base station and a mobile station is handed over to a second base station and the mobile station does not receive a handover confirmation from the second base station, the mobile station will utilize a signalling channel from the channel set of the second base station, to send a request for the re-establishment of the connection to the second base station. The second base station responds by transmitting a handover confirmation to the mobile station, and the connection continues, served by the second base station.

European Patent Application EP, A, 690 650 discloses a method in a cellular communications system in which a handover request from a mobile station is sorted into a queue until a channel becomes idle in the cell to which the connection should be handed over. According to this method, channels are reserved in the target cell (that is, the cell to which the connection is to be handed over) for the mobile stations in said queue, so that, for example, the establishment of new connections in the target cell is prevented if all idle channels in this cell have already been reserved for queuing mobile stations in the neighbouring cells. In this way, the risk of a connection being interrupted in connection with a handover is reduced.

International Patent Application WO, A, 96/07287 describes a method in which the handover of a low quality connection in a first cell, in the case of an emergency, is forced to a second cell having a higher signal strength. When a normal handover occurs, the signal strength in the target cell must exceed the signal strength in the original cell (that is, the cell from which the handover is initiated) with a certain hysteresis value. In an emergency situation, this hysteresis value may be lowered so that handover will occur at an earlier stage, reducing the risk of the connection being interrupted.

None of the above mentioned solutions indicates the possibility of temporarily parking a connection on a dedicated signalling channel while waiting for a traffic channel to become idle. The method according to U.S. Pat. No. 4,811,380 does employ a control channel, but through this channel only a request for reestablishment of an interrupted call is transmitted. The disclosed method is based on the mobile station indicating on the control channel that its speech connection has been interrupted. The mobile station then contacts the stationary system for a re-establishment of the connection. Such a reestablishment of an interrupted speech connection takes quite a long time and there is therefore a risk that at least one of the connected subscribers (the A or B subscriber) interrupts the call before the system has succeeded in re-establishing the connection.

SUMMARY OF THE INVENTION

The present invention presents a solution to the problem of interrupted speech connections in a mobile telecommunications system. In particular the invention is intended to reduce the risk of a total interruption of a call in connection with handover, but it also seeks to reduce the fraction of speech connections that are interrupted for other reasons. Such other reasons may be, for example, a system parameter being exceeded, poor signal quality caused by disturbances and blocking because of temporary overload.

An object of the present invention is thus to minimize the fraction of completely lost speech connections in a telecommunications system.

Another object of the invention is to shorten the time during which payload transmission between a mobile station and the stationary system is prevented in connection with the temporary interruption of a speech connection.

Yet another object of the invention is to inform the subscribers (the A and B subscribers) connected through a speech connection that has been temporarily interrupted, that the connection will be re-established shortly, to reduce the risk of any of the subscribers clears the connection.

It is also an object of the invention to reduce the fraction of speech connections that have to be disconnected because of the establishment of speech connections with a higher priority.

According to an embodiment of the invention method a parameter indicates that a certain speech connection is very likely to be disconnected. If the parameter has a too low value this indicates that the speech connection as soon as possible should be handed over to a channel having a higher quality than the current channel. While waiting for a better traffic channel to become available for the speech connection it is temporarily handed over (parked) to an idle dedicated control channel. Unfortunately, the dedicated control channel does not offer any possibility to communicate payload information between the connected subscribers but at least the connection is not disconnected. As soon as a traffic channel having sufficiently high quality becomes idle the connection is re-established on this channel.

A method according to this embodiment of the invention is thus characterized by that disclosed in claim 1.

According to a preferred embodiment of the method an indication is transmitted to the connected subscribers that the speech connection is temporarily handed over to a dedicated control channel. The indication is intended to keep the subscribers from interrupting the connection and is only generated in the case when the information communicated through the connection is human speech in real time.

An embodiment of the proposed apparatus includes a control unit receiving a set of parameters for a certain connection from the base station controller serving the connection. From the parameter set the control unit generates a combined parameter describing the quality of the speech connection. This parameter is compared to a certain threshold value in the control unit, and if it is lower than the threshold value, the control unit generates a first signal, which is returned to the base station controller. When receiving the first signal the base station controller preferably assigns a new traffic channel to the connection. If no such channel is available the connection is handed over to a dedicated control channel in another cell, as a temporary replacement for the traffic channel on which the connection was previously established but on which it can now, for some reason or other, no longer be maintained. The control unit detects if there is an idle traffic channel with the base station serving the connection, that is, (1) the base station through which the speech connection was originally established if handover is not an option or if there still has not been time to perform a handover or (2) if handover has been completed in the base station to which the connection has been handed over. As soon as the serving base station has an idle traffic channel the control unit assigns this channel to the connection and the communication of payload on the connection can then be resumed.

The apparatus according to the invention has the characteristic features disclosed in claim 17.

The proposed invention minimizes the fraction of connections that are lost in the telecommunications system where it is used by handing over the connections that risk being disconnected to high quality control channels before the connections are interrupted.

Compared to prior art solutions the solution according to the invention also reduces the time during which transmission of payload between a mobile station and the stationary system is prevented because of poor channel quality. This is because the connection is never completely interrupted but only parked on a temporary channel, the quality of which is greater than that of the original channel. Re-establishment of an interrupted connection generally always takes longer than handover of a connection from one channel to another.

The invention also offers the possibility to inform the subscribers connected through a connection that is temporarily parked on a dedicated control channel, that the connection will be re-established shortly. This reduces the risk of any of the subscribers actively ending the connection.

The invention also results in a reduced fraction of connections forced to disconnect because of the establishment of competing connections with a higher priority. Low priority connections may be parked on dedicated control channels while waiting for idle channel capacity, and thus do not have to be disconnected.

The invention also reduces the fraction of blocked connections caused by temporary overload in the mobile telecommunications system. Since some connections during ongoing handover are parked on idle dedicated control channels, several channels are released and may be used for the establishment of connections.

The invention will now be described in more detail by means of preferred embodiments and with reference to the appended drawings. The solution refers to a Global System for Mobile Communication (GSM), but is generally applicable in any mobile telecommunications system in which traffic channels and dedicated control channels are used.

DESCRIPTION OF PREFERRED EMBODIMENTS

Figure 1:
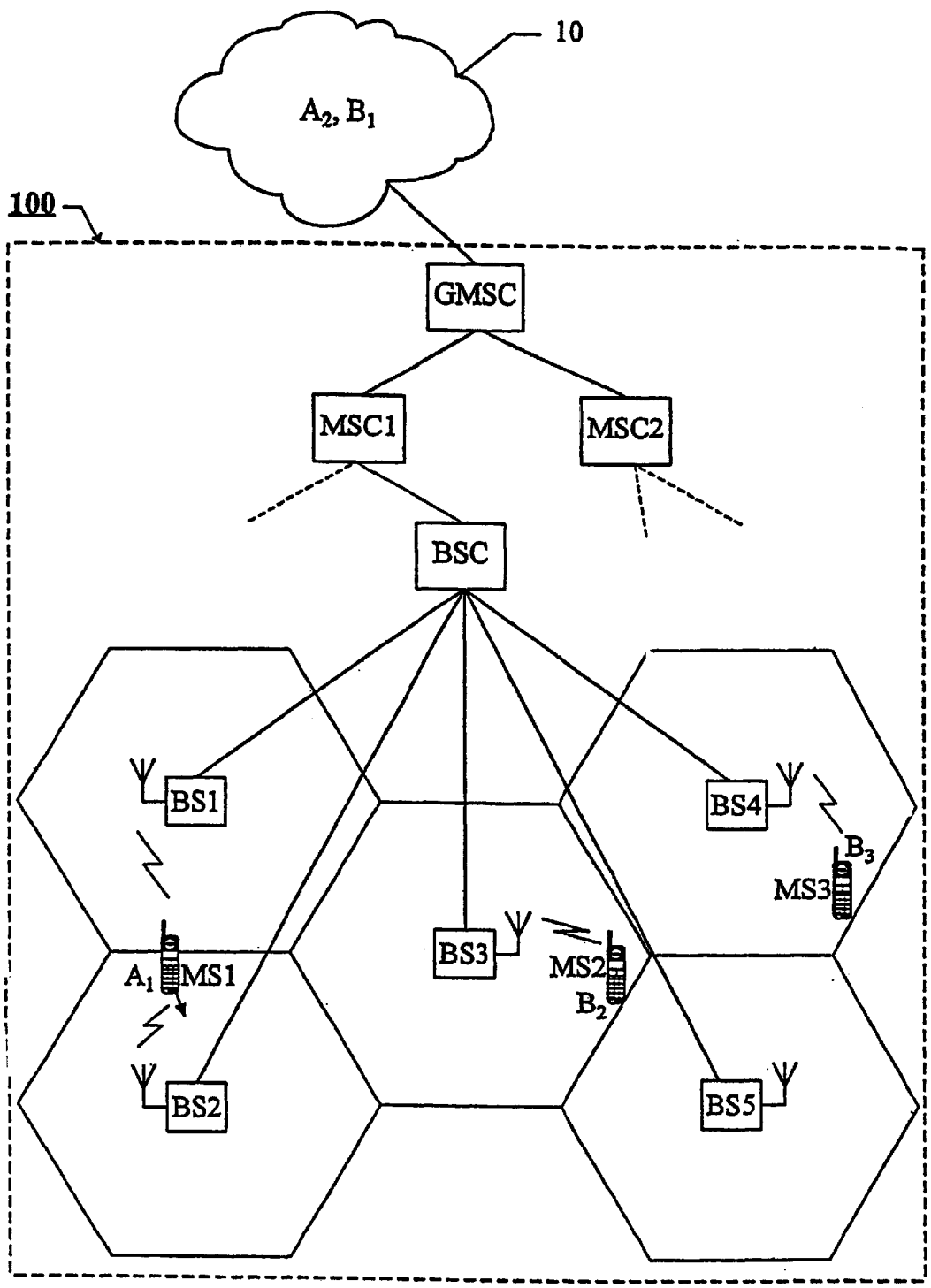
FIG. 1 shows a mobile telecommunications system, known per se, in which the invention is applied.

FIG. 1 shows a mobile telecommunications system 100, known per se, for example a GSM system, including mobile stations MS1–MS3, base stations BS1–BS5, base station controllers BSC, mobile services switching centres MSC and an inter-network exchange Gateway MSC or GMSC, through which the mobile telecommunications system 100 is connected to an external communications network 10 such as the Public Services Telephone Network (PSTN). A mobile station MS1 communicates payload comprising human speech or data through a traffic channel to a base station BS1. A calling subscriber A thereby achieves a speech connection with a called subscriber B. A first calling subscriber $A_1$ can communicate by means of the mobile station MS1 and a first called subscriber $B_1$ can be a subscriber in the external communications network 10. A second calling subscriber A2 can instead be connected to the external communications network 10 and a second called subscriber B2 can be situated in the mobile telecommunications system 100. Alternatively, of course, both the calling subscriber A1 and the called subscriber B2 can communicate through mobile stations MS1 and MS3 respectively in the mobile telecommunications system 100. In the latter case at least two traffic channels are needed, since each mobile station MS1, MS3 requires at last one separate traffic channel. When a mobile station MS1, communicating on a first traffic channel with a first base station BS1, moves away from this base station and closer to a second base station BS2, the mobile station MS1 probably reaches a point at which the signal strength from the second base station BS2 exceeds the signal strength of the first base station BS1. When this difference in signal strength exceeds a certain hysteresis value, the speech connection is normally handed over to the second base station BS2, that is, the mobile station MS1 is assigned a second traffic channel with the econd base station BS2, and the speech connection continues on his second traffic channel.

If, when handover is initiated, an idle traffic channel is not found with the second base station BS2, there is a risk that the speech connection to the first mobile station MS1 is interrupted, since the quality of the signal from the first base station will probably deteriorate when the first mobile station moves away from this base station. According to the proposed method the speech connection in such a situation is handed over to an idle dedicated control channel. Primarily, a dedicated control channel from the channel set of the second base station BS2 is selected, since the signal strength of a channel in this channel set is probably higher than with the first base station BS1. The handover procedure proceeds while the speech connection is parked on the control channel. As soon as a traffic channel becomes idle with the second base station BS2, the speech connection is assigned this channel. In exceptional cases the speech connection may be assigned a traffic channel with the first base station BS1 if there is such a channel with sufficiently high quality.

If, on the other hand, it is considered that a speech connection risks being interrupted shortly, when handover is not an option, preferably a dedicated control channel in the original cell is selected for temporary parking of the speech connection.

Figure 2:
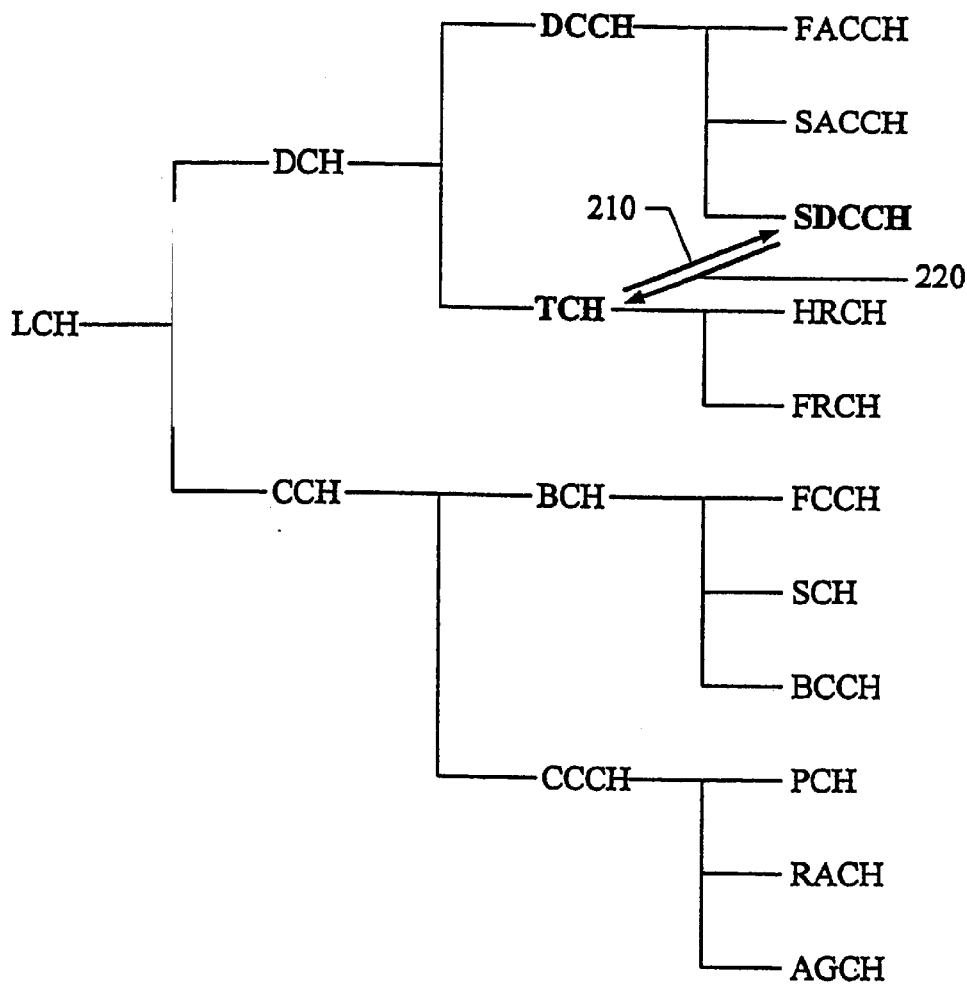
FIG. 2 illustrates the use of the inventive method on logical channels in a TDMA system.

FIG. 2 illustrated how the logical channels (LCH) in a TDMA system, such as the GSM system, can be divided into dedicated channels (DCH), intended to be assigned to a single user, and common channels (CCH) that may be used simultaneously by several users. The common channels CCH are in turn divided into non-selective channels, or Broadcast Channels BCH, and Common Control Channels CCCH, the broadcast channels comprising a Frequency Correction Channel FCCH, a Synchronization Channel SCH and a general channel for non-selective transmission, Broadcast Control Channel BCCH, and the common control channels CCCH comprising a Paging Channel PCH, an Random Access Channel RACH and an Access Grant Channel (AGCH). The dedicated channels DCH are traffic channels TCH and dedicated control channels DCCH. The traffic channels TCH may be divided in to Half Rate Channels (HTCH) and Full Rate Channels FRCH. The dedicated control channels DCCH are in turn divided into a Fast Associated Control Channel (FACCH) for the immediate control of a traffic channel, a Slow Associated Control Channel (SACCH) for less urgent transmission of information regarding a traffic channel, (such as measurement data) and a Stand-alone Dedicated Control Channel (SDCCH) used for signalling in connection with the establishment of a connection on a traffic channel TCH.

In a GSM system the method according to the invention is preferably implemented by temporarily handing 210 over a speech connection on an original traffic channel TCH, which risks being interrupted, to the Stand-alone Dedicated Control Channel (SDCCH) corresponding to the original Traffic Channel TCH. When a new Traffic Channel TCH becomes idle, the speech connection is handed over 220 to this new channel TCH, which may belong to the same base station as the original Traffic Channel TCH (and may even be identical to the original traffic channel TCH) or to another base station. A channel with full data rate (FRCH) after parking is normally handed over to a full data rate channel FRCH and a half rate channel HRCH is normally handed over to a half rate channel HRCH, but handover between channels of different kinds are of course also perceivable.

In an alternative analogue or digital mobile telecommunications system it if of course possible to instead park the speech connection on an arbitrary dedicated signalling channel DCCH, the function of which corresponds to the stand-alone dedicated signalling channel SDCCH in GSM.

Figure 3:
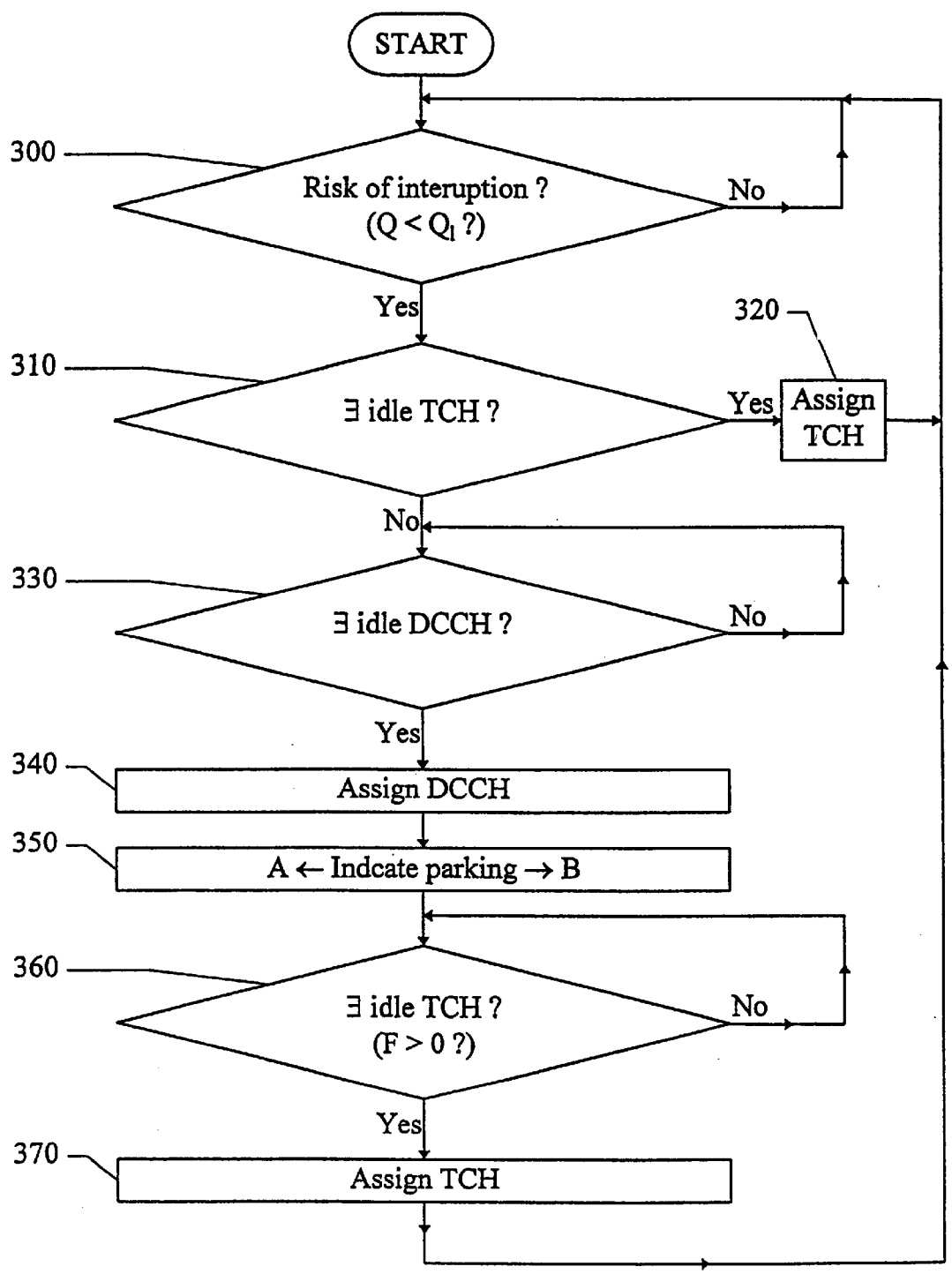
FIG. 3 illustrates, in a flow chart, the method according to the invention.

A flow chart of the method according to the invention is shown in FIG. 3. In a first step 300 it is determined whether or not a speech connection risks being interrupted, by comparing a quality parameter Q for the traffic channel TCH of the speech connection to a predetermined value $Q_1$. If the quality parameter Q is lower than the value $Q_1$, the risk of the connection being interrupted within a short time is considered to be high, and in this case, therefore, in step 310 it is checked if there is an idle traffic channel that may be used. If there is an idle and suitable traffic channel TCH, the speech connection is assigned to this channel TCH in step 320, before the procedure returns to the first step 300.

If on the other hand a traffic channel TCH available for the speech connection cannot be found, in step 330 it is checked if there is at least one idle dedicated control channel that may be used. As soon as such a channel becomes idle, in step 340 the speech connection is assigned this channel DCCH. Normally there is a suitable dedicated control channel DCCH that may be used at once. In step 350, the subscribers A and B that are connected through the speech connection (that is, the A and B subscriber, respectively) that the connection is being parked (and thus temporarily interrupted) but that the connection will be re-established shortly. This may be indicated by transmission of (1) an electronic text message which may in the GSM system be transmitted using the Short Message Service (SMS), or (2) a tone message or (3) comfort noise.

The electronic text message is only transmitted to subscribers in the mobile telecommunications network, while the other indication methods are applicable to any kind of subscriber. An alternative to transmitting an electronic text message to the mobile subscriber is letting the indication consist of a recorded voice message in the mobile station, which is triggered by a signal from the system. All the types of indications mentioned are transmitted on a dedicated control channel SDCCH and are transmitted only if the communicated payload is human speech in real time. Otherwise, the indication may corrupt communicated data.

In the following step 360 it is determined whether or not there is at least one idle traffic channel TCH to which the speech connection may be handed over. The investigation is carried out by supervision of a parameter F. A parameter value F greater than zero means that there is an idle traffic channel TCH that may be used. This traffic channel TCH may either belong to the original cell, that is, it may be a traffic channel TCH in the channel set of the base station that originally served the connection, or it may belong to the target cell, that is it may be a traffic channel TCH served by the base station to which the connection has been handed over. In the final step 370 the speech connection is assigned a traffic channel TCH as soon as, in step 360, it has been found that such a channel is available. The procedure then returns to the first step 300.

Figure 4:
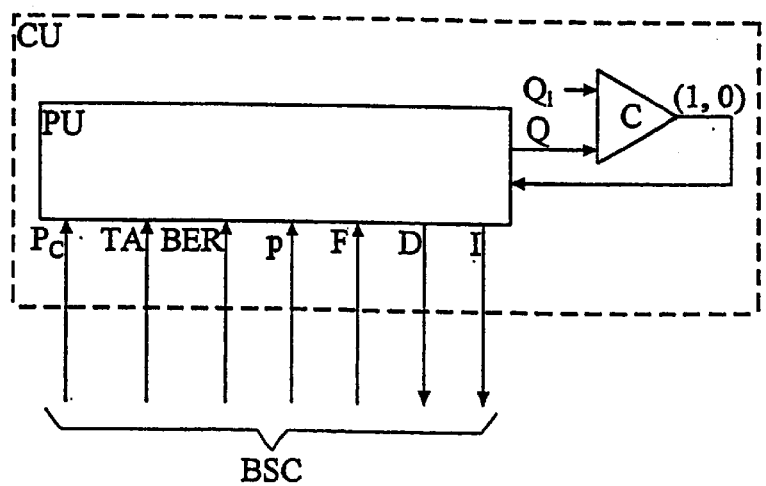
FIG. 4 shows an embodiment of the apparatus according to the invention.

An embodiment of the apparatus according to the invention is illustrated in FIG. 4. A control unit CU comprises a processing unit PU and a comparing unit C. The processing unit PU receives a set of parameters $P_c$, TA and BER from a base station controller BSC, said parameters being indicative of different quality parameters for a traffic channel. A first parameter $P_c$ in the set provides a value for the measured signal strength, which has been measured either on the uplink traffic channel by a base station or on its downlink by a mobile station, and reported to the base station controller BSC through a base station. A second parameter TA in the set denotes a current timing advance value for the mobile station using the traffic channel and a third parameter Bit Error Rate, BER, indicates the bit error rate of the traffic channel. The processing unit PU calculates, from one or more of the parameters $P_c$, TA, BER in the set a combined parameter Q. The combined parameter Q is derived in principle as the inverse of a Boolean OR combination of one or more of the parameter values $P_c$, TA and BER ($\overline{Q}=P_c+TA+1/BER$). Each of the parameters $P_c$, TA and BER must therefore fulfil a respective minimum condition in order to obtain an acceptable value of the combined parameter $\overline{Q}$. $\overline{Q}$ is proportional to the signal strength $P_c$ and inversely proportional to the bit error rate BER. The parameter value TA must be lower than or equal to a maximum value.

A high value of the combined parameter Q means that the channel quality is good. The comparing unit C compares the parameter value Q to a predetermined value $Q_1$. If the parameter Q is equal to or greater than $Q_1$ a first signal 0 is fed to the processing unit PU. If not, the comparing unit C feeds a second signal 1 to the processing unit PU, which then transmits a signal D to the base station controller BSC.

The processing unit PU in the control unit CU also receives a fourth parameter p, indicating the priority of the speech connection set up on the traffic channel. The processing unit PU compares the number of established speech connections having a higher priority than the priority p of the current speech connection, to the number of traffic channels associated with the serving base station. If the number of established speech connection having a higher priority than the current speech connection is greater than or equal to the number of traffic channels associated with the serving base station, this corresponds to the combined parameter Q being smaller than the predetermined value $Q_1$.

The signal D constitutes an order to hand over the speech connection to an idle dedicated control channel as soon as there is an idle one (which is normally immediately). Simultaneously an indication signal I is output from the control unit CU, said signal being transmitted to the connected subscribers through a dedicated control channel and informing them that the conversation is temporarily parked, on the condition that the connection is a speech connection. The processing unit PU simultaneously starts registering a variable F. If F is greater than or equal to zero this means that a suitable traffic channel is available. When F has a positive value, the control unit CU orders the base station controller BSC to hand over the speech connection to a traffic channel.

It is feasible to integrate the control unit CU with a base station controller BSC, but it may also be placed separately or in connection to another unit in the mobile telecommunications system.

What is claimed is:

1. A method in a mobile telecommunications system in which payload information is communicated in traffic channels, control information is communicated in dedicated control channels and a speech connection between a first subscriber and a second subscriber is established on at least one first traffic channel, for re-establishing said established speech connection if it risks being interrupted, comprising the following steps:

monitoring a parameter that represents the possibility of the established speech connection being interrupted while maintaining the established speech on said at least one first traffic channel;

handing over the speech connection from said at least one first traffic channel to a dedicated control channel if said parameter is less than a predetermined value; and handing over the speech connection from the dedicated control channel to at least one second traffic channel as soon as at least one such channel is available.

2. A method according to claim 1, characterized in that said payload information is human speech in real time, said first and second subscribers obtain an indication that said speech connection is temporarily handed over to a dedicated control channel and that said indication is given to them on a dedicated control channel.

3. A method according to claim 2, characterized in that said indication is a tone message.

4. A method according to claim 2, characterized in that said indication is comfort noise.

5. A method according to claim 2, characterized in that the subscriber or subscribers of said first and second subscriber being subscribers in the mobile telecommunications system receive said indication in the form of an electronic text message.

6. A method according to claim 2, characterized in that the subscriber or subscribers of said first and second subscriber being subscribers in the mobile telecommunications system receive said indication by a special signal from the mobile telecommunications system triggering a voice message in said mobile station.

7. A method according to claim 1, characterized in that said payload information is data, that is, other information than human speech in real time.

8. A method according to claim 1, characterized in that said parameter is based on a signal strength of said at least one first traffic channel on which said speech connection is originally maintained.

9. A method according to claim 8 in which said at least one first traffic channel is established in the telecommunications system between a certain mobile station and at least one base station, characterized in that said signal strength is measured by said mobile station and is reported to said base station.

10. A method according to claim 8 in which said at least one first traffic channel is established in the telecommunications system between a certain mobile station and at least one base station, characterized in that said signal strength is measured by said base station.

11. A method according to claim 1, in which said at least one first traffic channel is established in the telecommunications system between a certain mobile station and at least one base station, characterized in that said parameter is based on a system parameter, which is related to said at least one first traffic channel on which said speech connection is maintained.

12. A method according to claim 11, characterized in that said system parameter is constituted by a timing advance value for said mobile station.

13. A method according to claim 1, characterized in that said parameter is based on a bit error rate of aid at least one first traffic channel on which said speech connection is maintained.

14. A method according to claim 1, characterized in that said parameter is based on a priority of said speech connection relation to the priority of other speech connections being served by a particular base station.

15. A method according to claim 14, characterized in that said relationship is constituted by the number of established speech connection having a higher priority than the priority of said speech connection in relation to the number of traffic channels associated with said base station and that said parameter is lower than said predetermined value if the number of established speech connections having a priority higher than the priority of said speech connection is greater than or equal to the number of traffic channels associated by said base station.

16. A method according to claim 1, characterized in that said at last one first traffic channel is separated from said at least one second traffic channel.

17. An apparatus in a mobile telecommunications system comprising at least one base station controller, at least two base stations and a number of mobile stations, in which payload information is communicated through traffic channels, on which control information is communicated through dedicated control channels and in which a speech connection through a first subscriber and a second subscriber is established on at least one traffic channel between a certain mobile station and a base station in order to re-establish said speech connection if it risks being interrupted, including a control unit, wherein said at least one base station controller monitors said established speech connection between the first subscriber and the second subscriber and provides said control unit with a set of parameters indicating characteristics of said speech connection, that said control unit generates a parameter based on said set of parameters, said parameter indicating the quality of said speech connection, that said control unit compares the value of the parameter with a predetermined threshold value, whereby said control unit generates a first signal to said base station controller if the value of the parameter is less than the threshold value, that said base station controller when receiving said first signal hands over said established speech connection from said traffic channel to a dedicated control channel if there is no idle alternative traffic channel, for which the value of said parameter exceeds that of said traffic channel, that said control unit detects if there is an idle traffic channel with the base station serving said speech connection and that said control unit when said idle channel is found, hands over said speech connection to this channel.

18. An apparatus according to claim 17, characterized in that said control unit comprises a processing unit which generates said parameter and a comparing unit which compares the value of said parameter with said threshold value and outputs a result of the comparison to said processing unit.

19. An apparatus according to claim 17, characterized in that said control unit in connection with the generation of said first signal also generates a second signal which is transmitted to said base station and comprises a message indicating to said first subscriber and said second subscriber that said speech connection is temporarily handed over to a dedicated control channel.

* * * * *